Patented Jan. 14, 1941

2,228,885

UNITED STATES PATENT OFFICE 2,228,885

MANUFACTURE OF AMINO-HYDROXY-ANTHRAQUINONES

Henry Charles Olpin, Spondon, near Derby, England, assignor to Celanese Corporation of America, a corporation of Delaware No Drawing. Application November 5, 1938, Serial No. 239,143. In Great Britain December 7, 1937

8 Claims. (Cl. 260—380)

This invention relates to the manufacture of 1-amino-4-hydroxy-anthraquinones and their leuco compounds.

According to the present invention a leuco 1-amino-4-hydroxy-anthraquinone is prepared by acting on a leuco 1,4-dihydroxy-anthraquinone with ammonia and discontinuing the reaction before any substantial proportion of the corresponding 1,4-diamino-anthraquinone has been produced. The new process is of especial value for the production of 1-amino-4-hydroxy-anthraquinone itself, but it may also be used for the production of nuclear substitution products thereof free from substituents in the 2- and 3-positions of the anthraquinone nucleus. The further substituents may be, for example, further amino or hydroxyl groups, or alkoxy groups, sulphonic groups or halogen atoms.

Advantageously the ammonia is employed in excess of that theoretically required for the replacement of one of the 1- and 4-hydroxyl groups of the leuco 1,4-dihydroxy-anthraquinone. The use of a substantial excess of ammonia at temperatures below about 40° C. and especially at ordinary temperatures of say about 10–25° C., is particularly effective. Under these conditions the desired leuco 1-amino-4-hydroxy-anthraquinone is usually produced in a period of the order of two or three days without any substantial proportion of the 1,4-diamino-anthraquinone being produced.

If desired, however, though less advantageously, the ammonia can be used in substantially the proportion theoretically required for the replacement of one of the 1- and 4-hydroxyl groups of the leuco 1,4-dihydroxy-anthraquinone.

The reaction with the ammonia can be effected either in the presence of water or in the presence of an organic liquid, for example ethyl alcohol or other aliphatic alcohol. A convenient expedient is to subject the leuco 1,4-dihydroxy-anthraquinone to the action of a mixture of a water-miscible organic liquid, e. g. ethyl alcohol, with concentrated aqueous ammonia. For example, leuco 1-amino-4-hydroxy-anthraquinone of excellent quality can be prepared in good yield by stirring leuco quinizarin with a mixture of alcohol and concentrated aqueous ammonia for three days at ordinary temperatures, the proportion of ammonia employed being in considerable excess over that theoretically required for the production of the leuco 1-amino-4-hydroxy-anthraquinone. Several times the theoretical requirement of ammonia (e. g. 4 to 10 times) may be used.

At ordinary temperatures the reaction can be carried out at atmospheric pressure. At higher temperatures closed vessels are usually necessary to retain the ammonia and considerable pressure may be developed.

The leuco 1-amino-4-hydroxy-anthraquinones produced by the new process can readily be converted into the corresponding 1-amino-4-hydroxy-anthraquinones by an appropriate oxidation treatment. The conversion may be effected, for instance, by the action of free oxygen in the presence of an organic base such as pyridine or piperidine. Again, the conversion can be carried out by heating the leuco compound with ordinary concentrated sulphuric acid with or without nitro-benzene, or again by heating with sulphuric acid substantially free from water in the manner described in U. S. application S. No. 215,221 filed 22nd June, 1938, which has matured into U. S. Patent No. 2,189,012, issued February 6, 1940. In the case of oxidising leuco 1-amino-4-hydroxy-anthraquinone with substantially anhydrous sulphuric acid, a temperature of about 150° C. is effective. Similar temperatures may be used when effecting the oxidation with a mixture of ordinary concentrated sulphuric acid with nitro benzene. If ordinary concentrated sulphuric acid alone is employed, somewhat higher temperatures, say up to 180° C., can be used with advantage.

The invention is illustrated by the following example:

2,400 grams of leuco quinizarin are stirred at ordinary temperature for three days with a mixture of 4 litres of aqueous ammonia, specific gravity .880, and 8 litres of methylated spirit. The solid product is then filtered off and dried. In order to convert this leuco 1-amino-4-hydroxy-anthraquinone into 1-amino-4-hydroxy-anthraquinone, it is heated with 10 times its weight of 96% sulphuric acid and about one-third of its weight of nitro-benzene for one hour at 150 to 160° C. After cooling the sulphuric acid solution is poured into water and the 1-amino-4-hydroxy-anthraquinone filtered off, washed free from acid and dried.

As an alternative the oxidation can be carried out by heating with the sulphuric acid alone for about 1½ hours at 180° C.

If desired the leuco 1,4-dihydroxy-anthraquinone can be prepared in situ from the corresponding 1,4-dihydroxy-anthraquinone and an appropriate reducing agent, for example sodium hydrosulphite, Having described my invention, what I desire to secure by Letters Patent is:

1. Process for the production of a leuco 1-amino-4-hydroxy-anthraquinone, which comprises acting with ammonia on a leuco 1,4-dihydroxy-anthraquinone and discontinuing the reaction before any substantial proportion of the corresponding leuco 1,4-diamino-anthraquinone has been produced.

2. Process for the production of a leuco 1-amino-4-hydroxy-anthraquinone, which comprises acting on a leuco 1,4-dihydroxy-anthraquinone with a quantity of ammonia substantially in excess of that theoretically required for the replacement of one of the hydroxyl groups and discontinuing the reaction before any substantial proportion of the corresponding leuco 1,4-diamino-anthraquinone has been produced.

3. Process for the production of leuco 1-amino-4-hydroxy-anthraquinone, which comprises subjecting leuco 1,4-dihydroxy-anthraquinone to the action of a mixture of concentrated aqueous ammonia and a water-miscible organic liquid at ordinary temperature and discontinuing the reaction before any substantial proportion of the corresponding leuco-1,4-diamino-anthraquinone has been produced, the quantity of ammonia employed being several times that theoretically required for the replacement of one of the hydroxyl groups.

4. Process for the production of leuco-1-amino-4-hydroxy-anthraquinone, which comprises subjecting leuco 1,4-dihydroxy-anthraquinone to the action of a mixture of concentrated aqueous ammonia and ethyl alcohol for a period of about three days at ordinary temperatures, the quantity of ammonia used being 4 to 10 times that theoretically required for replacing one of the hydroxyl groups of the leuco 1,4-dihydroxy-anthraquinone.

5. Process for the production of a leuco 1-amino-4-hydroxy-anthraquinone, which comprises subjecting a leuco 1,4-dihydroxy-anthraquinone to the action of a mixture of concentrated aqueous ammonia and a water-miscible organic liquid at a temperature below 40° C., and discontinuing the reaction before any substantial proportion of the corresponding leuco-1,4-diamino-anthraquinone has been produced, the quantity of ammonia employed being several times that theoretically required for the replacement of one of the hydroxyl groups.

6. Process for the production of a leuco 1-amino-4-hydroxy-anthraquinone, which comprises acting on leuco 1,4,5-trihydroxy-anthraquinone with a quantity of ammonia substantially in excess of that theoretically required for the replacement of one of the hydroxyl groups and discontinuing the reaction before any substantial proportion of leuco 1,4-diamino-5-hydroxy-anthraquinone has been produced.

7. Process for the production of leuco 1-amino-4,5,8-trihydroxy-anthraquinone, which comprises acting on leuco 1,4,5,8-tetrahydroxy-anthraquinone with a quantity of ammonia substantially in excess of that theoretically required for the replacement of one of the hydroxyl groups and discontinuing the reaction before any substantial proportion of leuco 1,4-diamino-5,8-dihydroxy-anthraquinone has been produced.

8. The process which comprises producing a leuco 1-amino-4-hydroxy-anthraquinone by the process claimed in claim 1 and thereafter oxidizing the leuco compound to its parent 1-amino-4-hydroxy-anthraquinone.

HENRY CHARLES OLPIN.